United States Patent [19]

Matsuura

[11] Patent Number: 4,727,396

[45] Date of Patent: Feb. 23, 1988

[54] ZOOM TYPE COPIER

[75] Inventor: Hirokazu Matsuura, Yamatokoriyama, Japan

[73] Assignee: Sharp Kabushiki Kaisha, Osaka, Japan

[21] Appl. No.: 860,869

[22] Filed: May 8, 1986

[30] Foreign Application Priority Data

May 17, 1985 [JP] Japan ................................ 60-106261

[51] Int. Cl.[4] ...................... G03G 15/04; G03G 21/00; G03B 27/52

[52] U.S. Cl. ...................................... 355/14 R; 355/55

[58] Field of Search ..................... 355/8, 14 R, 14 CU, 355/55

[56] References Cited

U.S. PATENT DOCUMENTS 4,406,537 9/1983 Mori ............................... 355/14 SH 4,582,419 4/1986 Tanaka ................................ 355/55

FOREIGN PATENT DOCUMENTS 2909387 9/1979 Fed. Rep. of Germany .

3404428 8/1984 Fed. Rep. of Germany .

*Primary Examiner*—Fred L. Braun

*Attorney, Agent, or Firm*—Birch, Stewart, Kolasch, & Birch

[57] ABSTRACT

A magnification variable type electrophotographic copying machine includes a memory for storing a plurality of magnification scales of an original to be copied, a counter for counting the frequency of use for each of the plurality of magnification scales, and a display for displaying the magnification scale with the highest frequency of use when the copying machine is in a magnification variable mode.

3 Claims, 7 Drawing Figures

ZOOM TYPE COPIER

BACKGROUND OF THE INVENTION

The present invention relates to a magnification ratio selectable type electrophotographic copying machine and, more particularly, to a stepless magnification ratio selectable (zoom) type electrophotographic copying machine.

A new type of electrophotographic copying machine is provided which is of stepless magnification ratio-selectable type, called a zoom type herein. A keyboard is provided for selecting the magnification ratio over a wide range, so that a desired maginification ratio of an original can be selected. However, the selection operation of the magnification ratio is complicated, in particular, when a different magnification ratio is repeated frequently. Therefore, the present invention is expected to simplify the selection operation.

SUMMARY OF THE INVENTION

Accordingly, it is an object of the present invention to provide an improved magnification selectable type electrophotographic copying machine for selecting the magnification ratio of an original to be copied, dependent upon the frequency of use of that magnification ratio.

It is another object of the present invention to provide an improved magnification selectable type electrophotographic copying machine for selecting the magnification ratio of an original to be copied, dependent on its frequency of use, and, in addition, simplifying the operation of inputting the magnification ratio.

Briefly described, in accordance with the present invention, a magnification ratio selectable type (zoom type) electrophotographic copying machine comprises memory means for storing a plurality of magnification ratios, counting means for counting the frequency of use for each of the plurality of magnification ratios stored, and display means for displaying in turn the magnification ratios starting with those of the highest counted frequency.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1A:
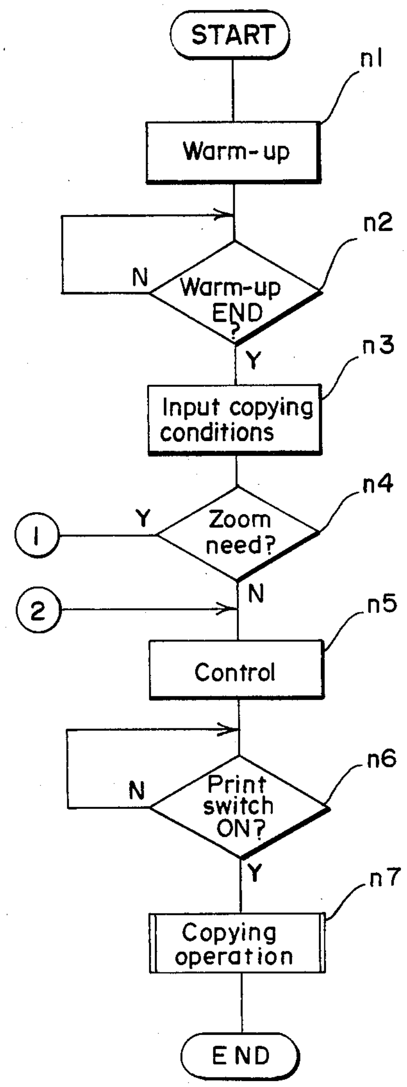
FIGS. 1(A) to 1(D) are flow charts of the operation of a zoom type electrophotographic copying machine according to the present invention.
Figure 1B:
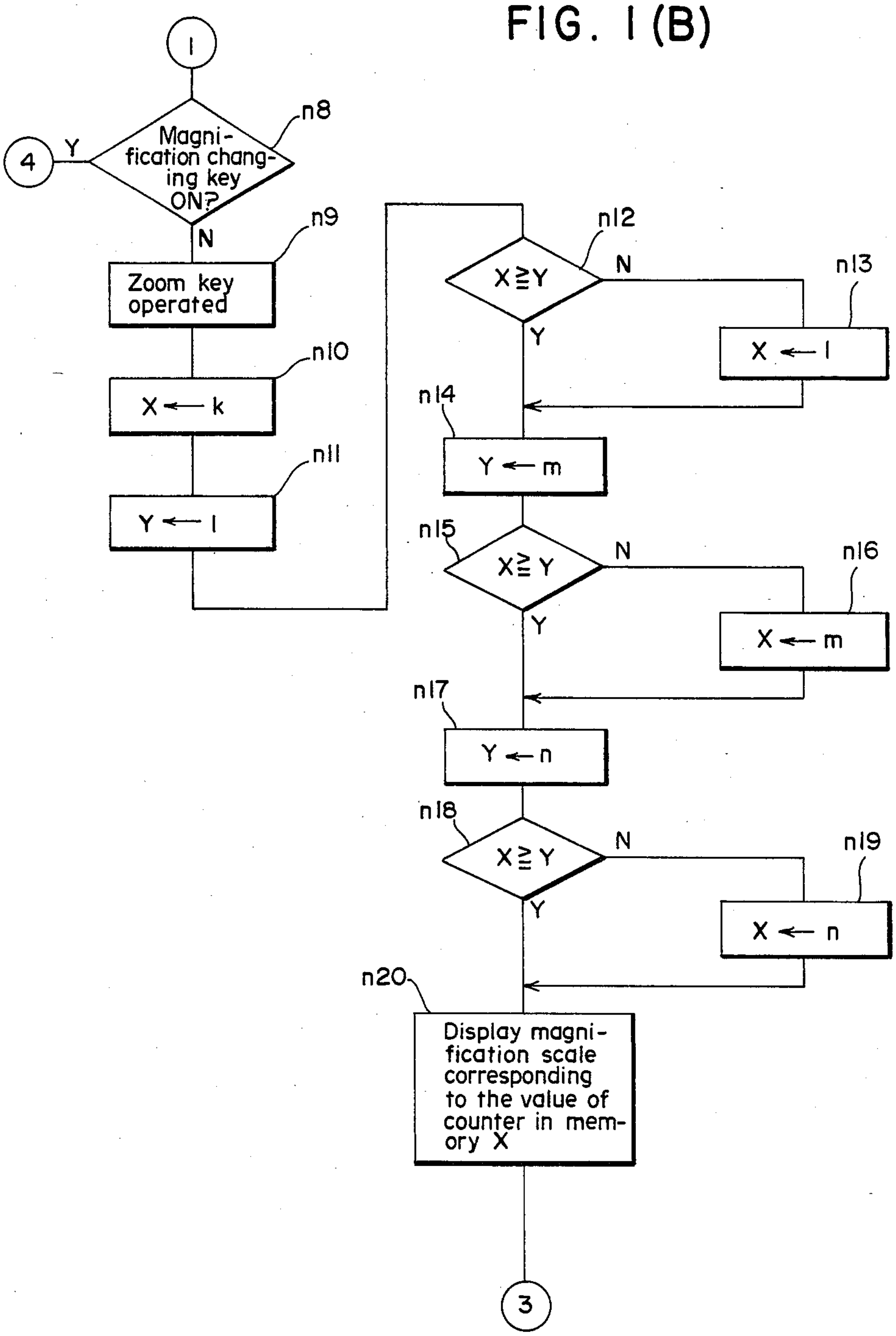
Figure 1C:
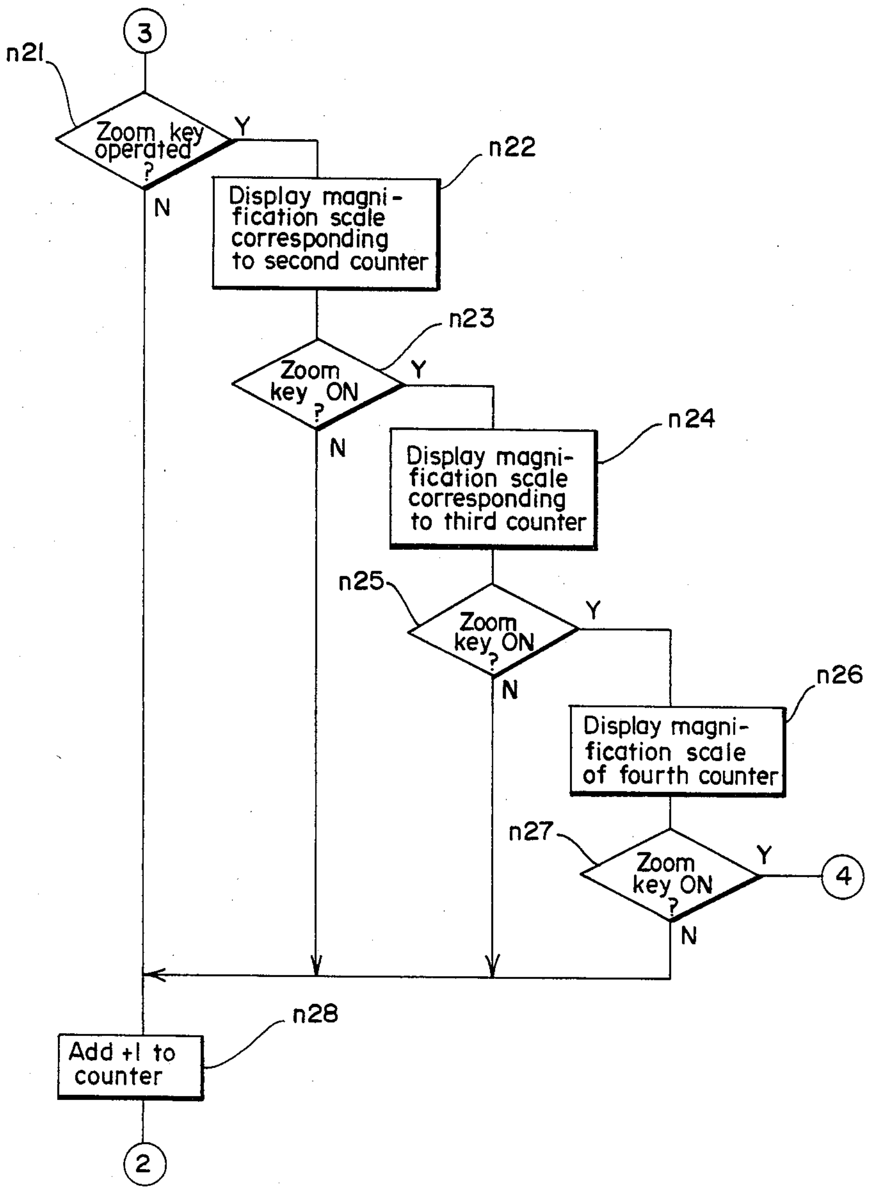
Figure 1D:
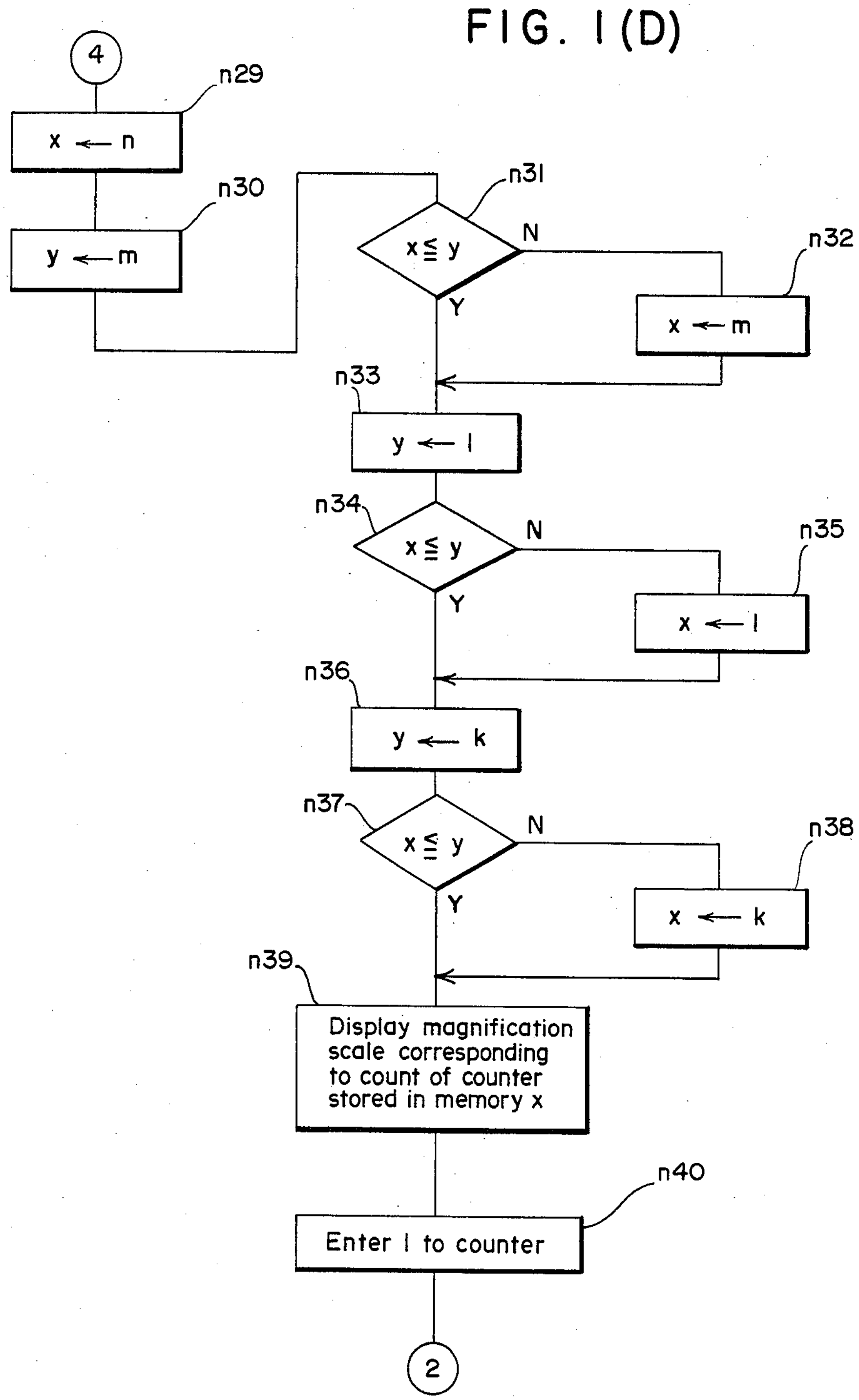
Figure 2:
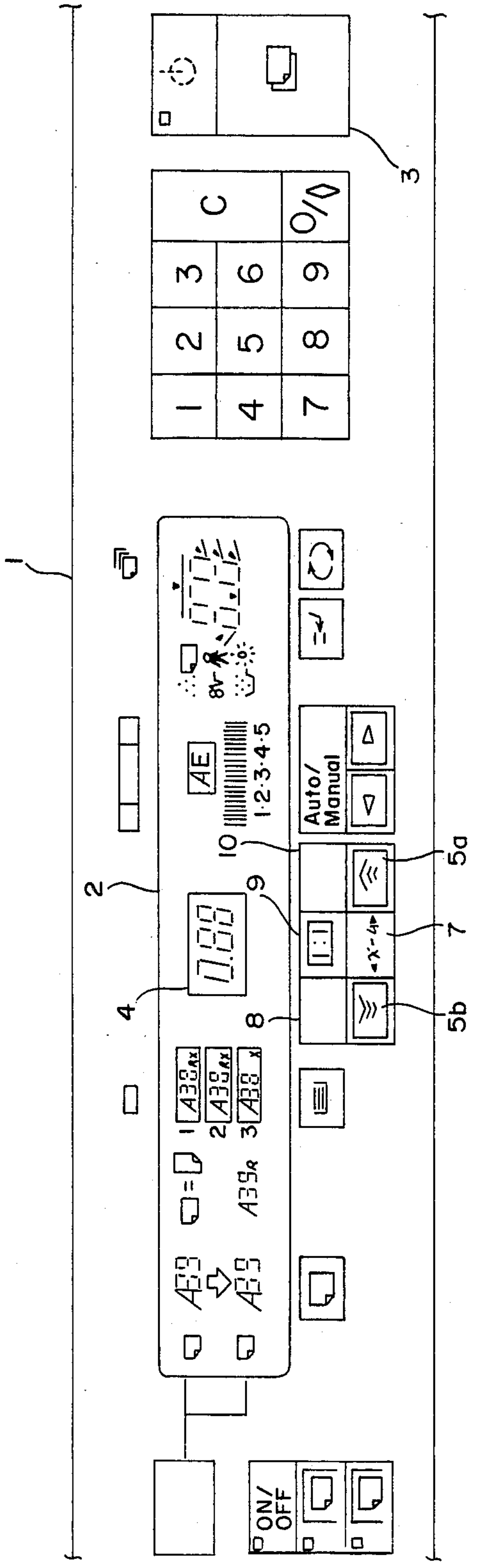
FIG. 2 is a plan view of operation switches on a panel in the copying machine of FIG. 1.

FIG. 2 shows a plan view of operation switches disposed on an operation panel of a magnification selectable type, referred to as a zoom type, electrophotographic copying machine.

Referring to FIG. 2, the operational panel comprises a display 2 for displaying various operational conditions of the copying machine. At the center of the display 2, a magnification scale display 4 is provided for displaying the maginification scales or ratios of an original to be copied. Under the display 2, an equal size key 9 is provided which is operated to select an equal-size mode, a fixed reduction key 8 is provided which is operated to select a fixed reduction mode, and a fixed enlargement key 10 is provided which is operable to select a fixed enlargement mode. The keys 8 and 10 are operated to select a fixed reduction and enlargement mode for reducing and enlarging the standard-size original up to some fixed standard reduction and enlargement scale, respectively.

Under those keys, two magnification changing keys 5*a* and 5*b*, and a zoom key 7 are provided. The magnification changing keys 5*a* and 5*b* are operated to increase or decrease the magnification scale at the interval of about 1/100. The enlargement magnification key 5*a* is operated to increase the magnification scale as displayed in the magnification scale display 4. The reduction magnification key 5*b* is operated to decrease the magnification scale. The zoom key 7 is operated to recall the magnification scale as stored within a memory as will be described later.

According to the key selection, the selected magnification scale is displayed in the display 4 together with the indication that a lens system is moved so as to meet with the selected magnification scale. In reply to the operation of a print switch 3, a photoreceptor can be rotated to enable the displayed magnification scale so as to carry out the selected copying operation.

Figure 3:
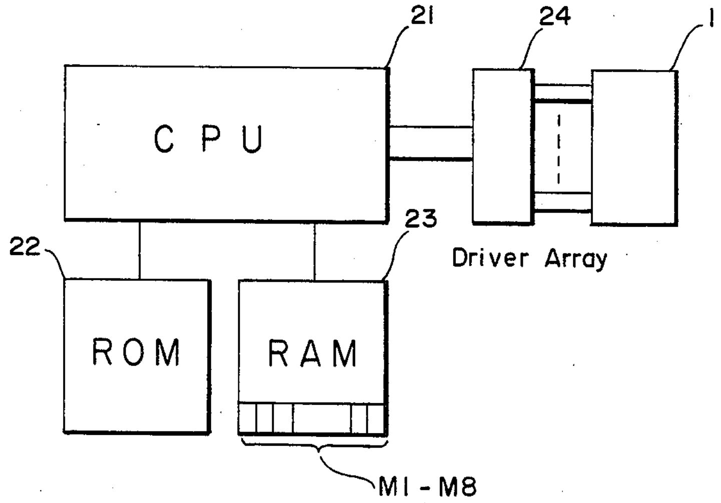
FIG. 3 is a block diagram of a circuit implemented within the copying machine of the present invention.

FIG. 3 is a block diagram of a circuit of the zoom copying machine of the present invention.

The circuit comprises a Central Processing Unit (CPU) 21, a Read Only Memory (ROM) 22 for storing the control program dominating the operation of the CPU to control the position of the lens system and rotate the photoreceptor depending on the magnification scales, a Random Access Momory (RAM) 23 for inputting and outputting various data in connection with the copying operation, and a driver array 24 coupled to the operational panel 1.

Figure 4:
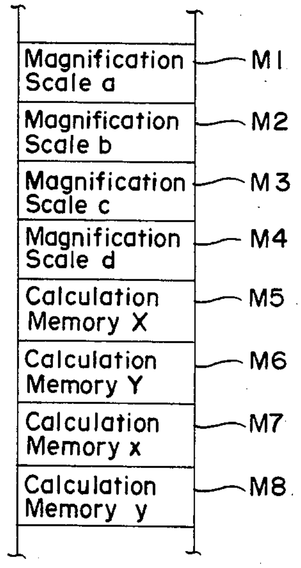
FIG. 4 is a schematic diagram of a random access memory (RAM) forming a memory of the circuit.

FIG. 4 shows a memory map of the RAM 23. Part of the RAM 23 comprises a plurality of memory areas M1–M8. Each of the memory area M1–M4 stores the magnification scales a–d selected by the magnification changing keys 5*a* and 5*b*. Those magnification scales a–d are automatically input into the memory areas in response to the key input by the operator. Each of the memory areas M5–M8 is used as calculation memories X, Y, and x and y so as to retrieve the magnification scales with the highest or lowest frequency of use. The RAM 23 also includes counters k, l, m, and n for counting the frequency of use in connection with each of the magnification scales a–d.

FIGS. 1(A)–1(D) are a flow chart of the operation of the zoom type copying machine performing the following steps.

Step n1: A warm-up operation is carried out upon the application of power.

Step n2: The end of the warm-up is detected.

Step n3: The copying condition such as the number of duplicating the copies and the copy size is input.

Step n4: It is detected whether the magnification changing keys 5*a* and 5*b*, or the zoom key 7 is operated.

Step n5: This step is selected when none of the keys 5*a*, 5*b*, and 7 are operated, namely, the zoom copying mode is not selected. The copying machine mechanisms are operated according to the selected data.

Step n6: It is detected whether the print switch 3 is actuated.

Step n7: Following the actuation of the print switch 3 in step n6, the copying operation is carried out in step n7.

Step n8: If the zoom copying mode is selected in step n4, the operation jumps to step n8 in which it is detected whether the magnification changing keys 5*a* and 5*b* are operated or not.

Step n9: If neither of the magnification changing keys is actuated in step n8, in step n9 the zoom key 9 is operated.

Step n10: In step n10, the contents of the calculation memory X are set to be the contents of the counter k.

Step n11: In step n11, the contents of the calculation memory Y are set to be the contents of the counter l.

Step n12: The contents of the calculation memory X are compared with those of the calculation memory Y.

Step n13: The contents of the calculation memory X become identical with those of the counter l if the contents of the calculation memory Y are larger than those of the calculation memory X. Step n14 is advanced then.

Step 14: When it is detected in step n12 that the contents of the calculation memory X are larger than those of the calculation memory Y, step n14 is directly advanced.

Step n14: This step is also selected in which the contents of the calculation memory Y are set to be identical with those of the counter m.

Step n15: The contents of the calculation memory X are compared with those of the calculation memory Y.

Step n16: This step is selected when it is detected in step n15 that the contents of the calculation memory Y are larger than those of the calculation memory X, so that the contents of the calculation memory X are set to be those of the counter m. Step n17 is then advanced. Step n17 is directly selected when the contents of the calculation memory X are larger than those of the calculation memory Y.

Step n17: The contents of the calculation memory Y are set to be those of the counter n.

Step n18: The contents of the calculation memory X are compared with those of the calculation memory Y.

Step n19: Step n19 is enabled so that the contents of the calculation memory X are set to be those of the counter n when the contents of the calculation memory Y are larger than those of the calculation memory X. Step n20 is advanced then. Step n20 is directly selected when the contents of the calculation memory X are larger than those of the calculation memory Y.

The operations of steps n10–n19 retrieve the counter with the highest frequency of use.

Step n20: The maginification scale corresponding to the contents of the calculation memory X, i.e., the frequency value of the counter is displayed in the magnification display 4. If the contents of the calculation memory X are those of the counter k, the magification scale a is displayed.

Step n21: It is detected whether the zoom key 7 is operated. If this key 7 is actuated, it is detected that the displayed magnification scale is not identical with the scale desired by the operator.

Step n22: The magnification scale corresponding to the counter with the second highest frequency of use is displayed.

In such a case, the data of the remaining three counters except the counter with the highest frequency of use are subject to the same retrieval operations as in steps n10–n19.

Step n23: It is detected whether the zoom key 7 is further operated. If so, step n24 is selected.

Step n24: This step is selected to display the magnification scale corresponding to the counter with the third highest frequency of use.

Step n25: If the zoom key 7 is operated in step n25, step n26 is selected to display the magnification scale corresponding to the counter with the fourth highest frequency of use.

Step n27: If the zoom key 7 is operated in step n27, it is detected that the magnification scale desired by the operator is absent within the memory of the copying machine. Step n29 is advanced then.

If it is detected that the zoom key 7 is not operated in one of steps n21, n23, n25, or n27, it is detected that the magnification scale displayed in the magnification scale display 4 in each of steps n20, n22, n24, and n26 is selected. Step n28 is advanced then.

Step n28: The contents of the couner having the selected magnification scale are added by "+1". Step n5 is returned in which the magnification scale as displayed in the magnification display 4 is carried out by operating the copying machine machanisms.

Step n29: Step n29 is selected when either of the magnification changing keys 5*a* and 5*b* is operated in step n8, or, otherwise, when the zoom key 7 is operated in step n27, so that it is detected that the magnification scale desired by the operator is not stored within the memory. In step n29, the contents of the calculation memory x of the memory area M7 are set to be the frequency value of the counter n.

Step n30: In this step, the contents of the calculation memory y of the memory area M8 are set to be the frequency value of the counter m.

Step n31: The contents of the memory x are compared with those of memory y.

Step n32: When the contents of the memory x are larger than those of the memory y, step n32 is executed so that the contents of the memory x are set to be those of the counter m. Step n33 is advanced then. If the contents of the memory y are larger than those of the memory x, step n33 is directly selected.

Step n33: In this step, the contents of the memory y are set to be the contents of the counter l.

Step n34: The contents of the memory x are compared with those of the memory y.

Step n35: If the contents of the memory x are larger than those of the memory y in step n34, step n35 is selected in which the contents of the memory x are changed to be those of the counter l. Step n36 is advanced then. If the contents of the memory y are larger than those of the memory x, step n36 is directly selected.

Step n36: The contents of the memory y are set to be those of the counter k. Step n37 is advanced then.

Step n37: The contents of the memory x are compared with those of the memory y. If the contents of the memory x are larger than those of the memory y, in step n38 the contents of the memory x are changed to the frequency value of the counter k. Step n39 is advanced then. Step n39 is directly selected if the contents of the memory y are larger than those of the memory x.

Step n39: The magnification scale corresponding to the contents of the counter stored within the calculation memory x is treated as the magnification scale z input by the operation of the magnification changing key 5*a* or 5*b*.

Step n40: The count of the counter which are stored within the memory x is set to be "1". Step n5 is returned.

The operations of steps n29–n38 enable the selection of the smallest frequency value of the counts of the counters k, l, m, and n.

Step n39: The magnification scale corresponding to the count of the counter which is selected because of the smallest frequency value is stored as the newly input magnification scale z.

As described, in accordance with the present invention, the new magnification scale as selected by the operator with the magnification changing key 5*a* or 5*b* replaces the frequency data in any one of the memory areas M1–M4 of the RAM 23, the replaced memory area storing the lowest frequency of use of the magnification scale. Each time the zoom key 7 is operated to recall the magnification scale, the frequency counts of the counters corresponding to the memory areas are subsequently retrieved, so that the magnification scales of the highest frequencies of use are in turn displayed starting with the larger frequency of use. Thus, a plurality of magnification scales are stored and displayed subsequently depending on the highest frequency of use.

Since the selected magnification scale or the newly inputted magnification scale is read out at the first time with the operations of steps n10–n19, as seen in steps n1, n15, and n18, the magnification scales which have been more recently used are in turned displayed among the magnification scale with the same frequency value of use. The zooming operation is therefore easier.

While only certain embodiments of the present invention have been described, it will be apparent to those skilled in the art that various changes and modifications may be made therein without departing from the spirit and scope of the present invention as claimed.

What is claimed is:

1. An electrophotographic copying machine having changeable magnification scales, comprising:

first memory means having a plurality of memory areas for storing a corresponding plurality of magnification scales;

means for counting the frequency of use for each of said plurality of magnification scales;

second memory means, having a plurality of memory areas paired with said plurality of memory areas in said first memory means, for storing a counted frequency for each of said plurality of magnification scales;

manual selection means for enabling an operator to select one of said plurality of magnification scales;

automatic selection means for automatically selecting a magnification scale having a highest frequency of use as counted by said means for counting, said automatic selection means being operable in the absence of an operation of said manual selection means; and means for displaying the magnification scale having the highest frequency of use when said copying machine is in a magnification copying mode.

2. A copying machine according to claim 1, further including:

control means for determining a most recently used copying magnification when at least two of said plurality of magnification scales have an identical highest frequency of use;

said means for displaying being responsive to said control means to display the magnification scale having the highest frequency and most recent use.

3. The copying machine according to claim 1, further including:

means for replacing magnification scale in said copying machine with a new magnification scale; and means, responsive to said means for replacing, for accessing a memory area of said second memory means corresponding to a memory area of said replaced magnification scale in said first memory means, and initializing the counted frequency thereof with a lowest frequency of use for said new magnification scale.

* * * * *